United States Patent
Graham et al.

(10) Patent No.: US 12,011,958 B2
(45) Date of Patent: Jun. 18, 2024

(54) SELF-LOCKING HITCH ASSEMBLY

(71) Applicant: DEERE & COMPANY, Moline, IL (US)

(72) Inventors: William Douglas Graham, East Moline, IL (US); Anand Mudanur, Pune (IN); Anant Dnyanoba Nimbalkar, Pune (IN); Pravin Pawar, Pune (IN)

(73) Assignee: DEERE & COMPANY, Moline, IL (US)

( * ) Notice: Subject to any disclaimer, the term of this patent is extended or adjusted under 35 U.S.C. 154(b) by 718 days.

(21) Appl. No.: 17/140,653

(22) Filed: Jan. 4, 2021

(65) Prior Publication Data

US 2022/0212507 A1    Jul. 7, 2022

(51) Int. Cl.
*B60D 1/167*    (2006.01)
*B60D 1/24*    (2006.01)
*B60D 1/42*    (2006.01)

(52) U.S. Cl.
CPC ............. *B60D 1/1675* (2013.01); *B60D 1/42* (2013.01); *B60D 1/246* (2013.01)

(58) Field of Classification Search
CPC ......... B60D 1/1675; B60D 1/42; B60D 1/246
See application file for complete search history.

(56) References Cited

U.S. PATENT DOCUMENTS

| | | |
|---|---|---|
| 2008/0121402 A1 | 5/2008 | Ruckle et al. |
| 2013/0319701 A1 | 12/2013 | Kromminga |
| 2015/0123378 A1 * | 5/2015 | Tortellier |
| 2019/0380253 A1 | 12/2019 | Thielicke et al. |

OTHER PUBLICATIONS

1830 Flex Air Hoe Drill Predelivery Instructions, Deere & Company, Aug. 28, 2020, 266 pages.
1830 Flex Air Hoe Drill Operator's Manual, Deere & Company, Jul. 27, 2020, 172 pages.
Extended European Search Report and Written Opinion issued in European Patent Application No. 21213935.6, dated Jun. 8, 2022, in 05 pages.

* cited by examiner

*Primary Examiner* — James A Shriver, II
*Assistant Examiner* — Nicholas R. Kandas
(74) *Attorney, Agent, or Firm* — Taft Stettinius & Hollister LLP; Stephen F. Rost

(57) ABSTRACT

An exemplary self-locking actuator mechanism includes a floating plate and a linear actuator. The floating plate defines a first slot that includes a first central portion, a first jog extending laterally from a first end of the first central portion, and a second jog extending laterally from a second end of the first central portion. The linear actuator includes a shaft pivotably connected to the floating plate, and is operable to drive the shaft between a first shaft position and a second shaft position to thereby move the self-locking actuator mechanism between a first locking state and a second locking state.

20 Claims, 8 Drawing Sheets

SELF-LOCKING HITCH ASSEMBLY

TECHNICAL FIELD

The present disclosure generally relates to hitch assemblies, and more particularly but not exclusively relates to hitch assemblies for agricultural equipment.

BACKGROUND

Hitch assemblies are commonly used to join agricultural equipment. Certain existing hitch assemblies suffer from various drawbacks and limitations. For example, certain existing hitch assemblies provide for a fixed orientation of a link connecting first and second pieces of agricultural equipment. However, an orientation that is suitable for a first mode of operation (e.g., road transportation) may not necessarily be desirable for a second mode of operation (e.g., field transportation). For these reasons among others, there remains a need for further improvements in this technological field.

SUMMARY

An exemplary self-locking actuator mechanism includes a floating plate and a linear actuator. The floating plate defines a first slot that includes a first central portion, a first jog extending laterally from a first end of the first central portion, and a second jog extending laterally from a second end of the first central portion. The linear actuator includes a shaft pivotably connected to the floating plate, and is operable to drive the shaft between a first shaft position and a second shaft position to thereby move the self-locking actuator mechanism between a first locking state and a second locking state. Further embodiments, forms, features, and aspects of the present application shall become apparent from the description and figures provided herewith.

DETAILED DESCRIPTION OF ILLUSTRATIVE EMBODIMENTS

Figure 1:
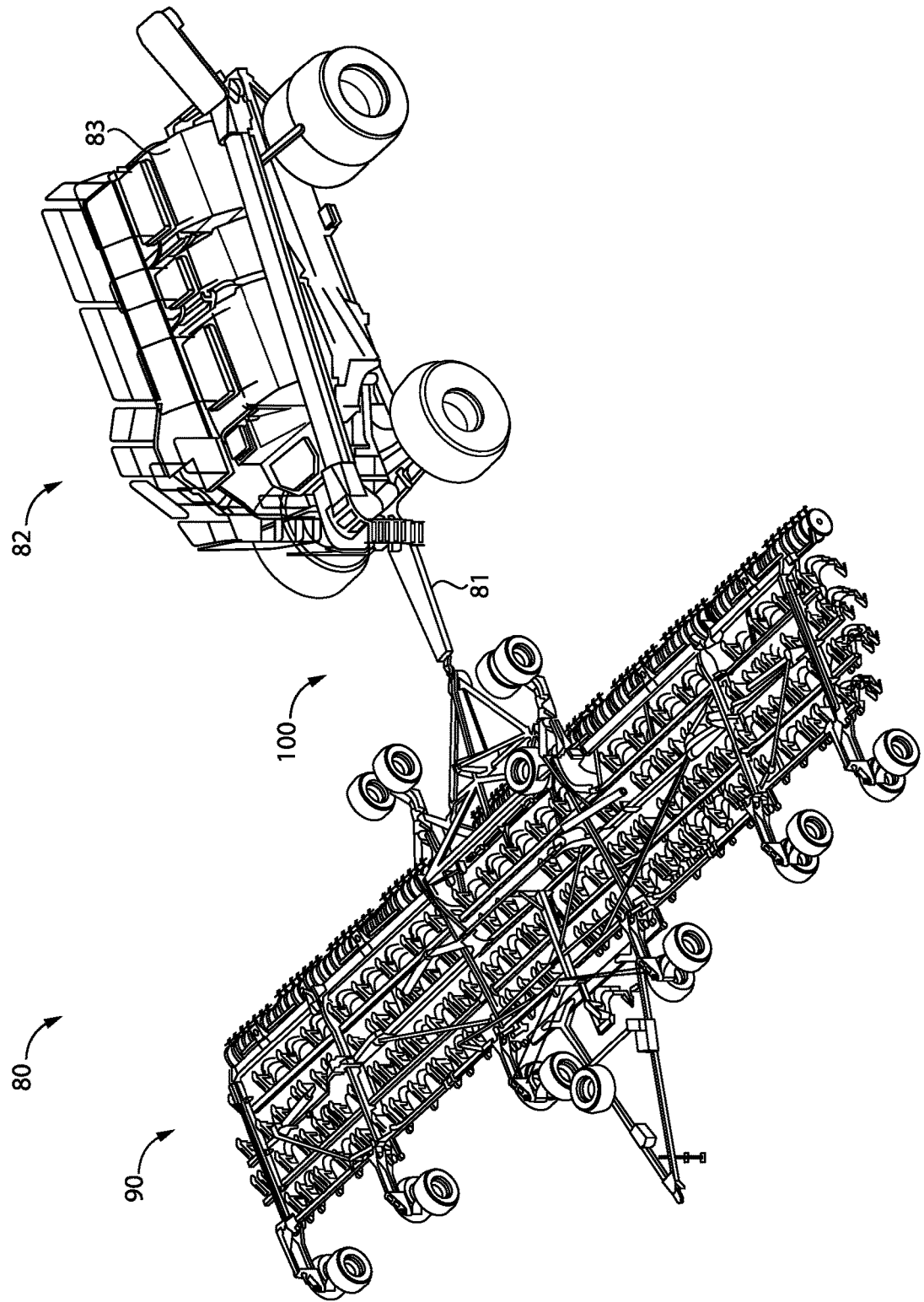
FIG. 1 is a perspective view of agricultural equipment according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The term "substantially" as used herein may be applied to modify a quantitative representation that could permissibly vary without resulting in a change in the basic function to which it is related. For example, components or features described as being "substantially parallel" or "substantially perpendicular" to one another may be slightly oblique relative to one another. In certain circumstances, the degree of obliquity may be 10° or less, or 5° or less. Moreover, it should be understood that the term "substantially perpendicular" encompasses the term "perpendicular," and that the term "substantially parallel" encompasses the term "parallel." Thus, "substantially perpendicular" can mean "between 85° and 95°" or "between 80° and 100°," while "substantially parallel" can mean "10° or less" or "5° or less."

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is agricultural equipment 80 according to certain embodiments. The agricultural equipment 80 generally includes a first piece of mobile agricultural equipment such as a cart 82, a second piece of mobile agricultural equipment such as a trailer 90, and a hitch assembly 100 according to certain embodiments that joins the trailer 90 and the cart 82. In the illustrated form, the trailer 90 is provided as an air-seeding tool, and the cart 82 includes a reservoir 83 that carries the agricultural product to be distributed by the distribution trailer 90. It is also contemplated that the hitch assembly 100 may be utilized to join a trailer and/or a cart to a tractor or other towing vehicle. In certain forms, the agricultural equipment 80 may be provided in a tow-behind configuration, in which the trailer 90 is coupled between a towing vehicle and the cart 82 such that the cart 82 follows the trailer 90 during normal forward operation of the towing vehicle. It is also contemplated that the agricultural equipment 80 may be provided in a tow-between configuration, in which the cart 82 is coupled between the towing vehicle and the trailer 90 such that the trailer 90 follows the cart 82 during normal forward movement of the towing vehicle.

Figure 2:
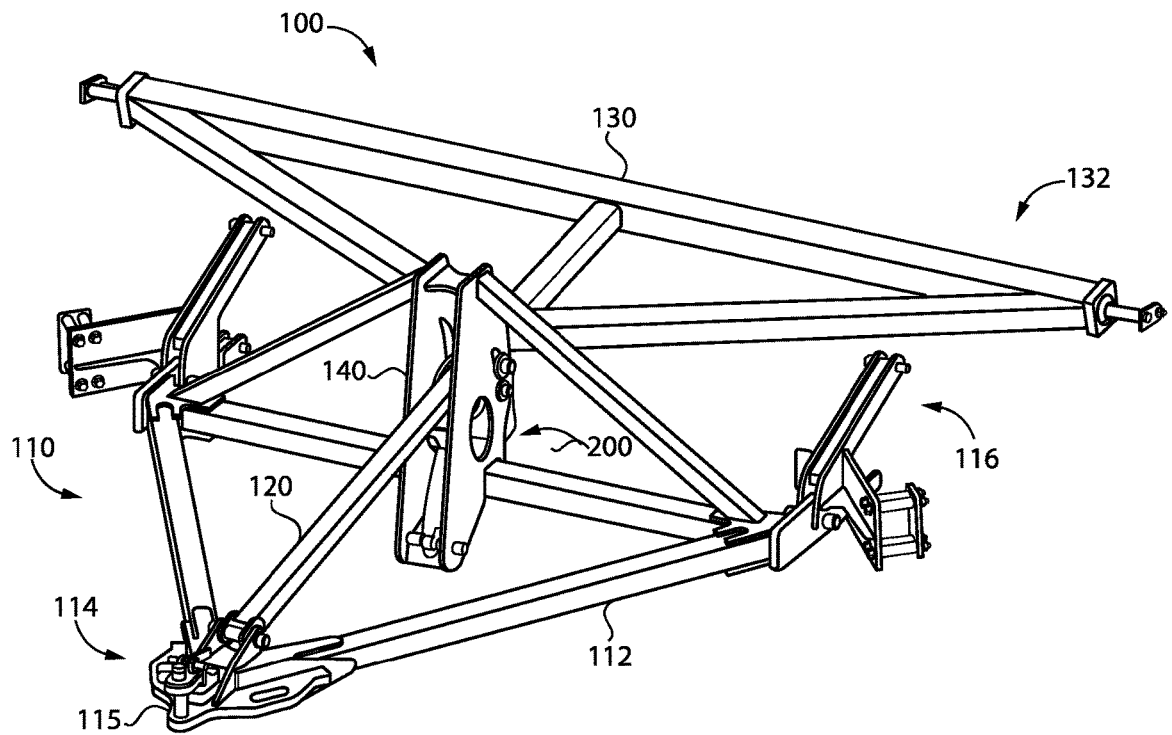
FIG. 2 is a perspective view of a hitch assembly according to certain embodiments.
Figure 3:
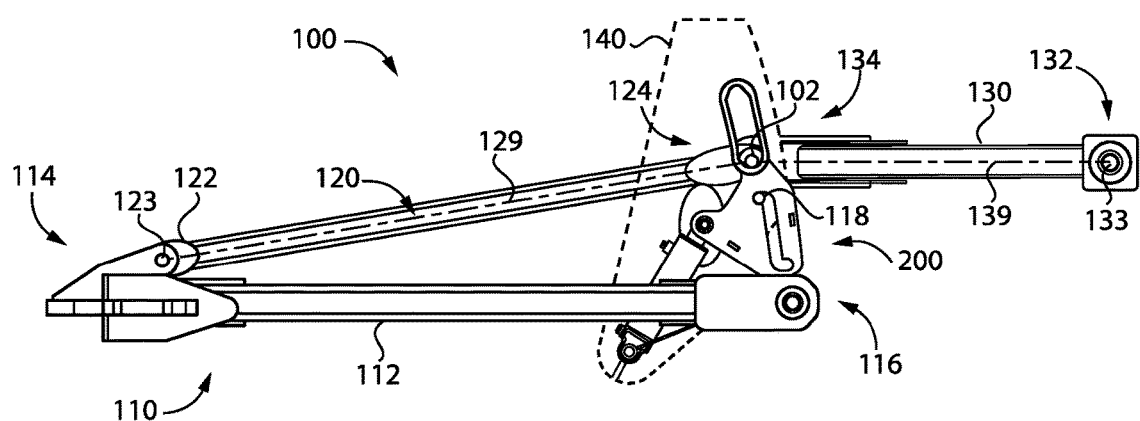
FIG. 3 is a side view of the hitch assembly.

With additional reference to FIGS. 2 and 3, the hitch assembly 100 generally includes a main frame 110, a first link 120 pivotably mounted to the main frame 110, a second link 130 pivotably coupled to the first link 120, and a self-locking actuator mechanism 200 according to certain embodiments. As described herein, the actuator mechanism 200 is operable to transition between a first locking state and a second locking state to move the hitch assembly 100 between a first state and a second state, thereby altering a relative orientation of the first link 120 and the second link 130.

The main frame 110 generally includes a base portion 112 and a support plate 140 mounted to the base portion 112 and extending upward from the base portion 112. A first end portion 114 of the main frame 110 is configured for coupling to a first piece of agricultural equipment, and a second end portion 116 of the main frame 110 is configured for coupling to a second piece of agricultural equipment. In the illustrated form, the first end portion 114 of the main frame 110 is configured for coupling to the cart 82, and includes a conventional hitch 115 for such coupling. It is also contemplated that the first end portion 114 may be configured for coupling to other types of agricultural equipment, such as a tractor or other towing vehicle. In the illustrated form, the second end portion 116 of the main frame 110 is configured for pivotable coupling to the trailer 90. It is also contemplated that the second end portion 116 may be configured for coupling to other types of agricultural equipment. The main frame 110 further includes a projection 118, which in the illustrated form is provided in the form of a pin securely mounted to the support plate 140. As described herein, the projection 118 cooperates with the actuator mechanism 200 to selectively lock the first link 120 and the second link 130 in selected relative orientations.

The first link 120 has a first end 122 pivotably coupled to the main frame 110 for pivoting about a first pivot axis 123, and extends along a first link longitudinal axis 129 between the first end 122 and an opposite second end 124. As described herein, the second end 124 of the first link 120 is pivotably coupled to the second link 130 by a pivot pin 102 that extends into a slot 142 formed in the support plate 140.

The second link 130 has a first end 132 configured for pivotable coupling with a second piece of agricultural equipment about a pivot axis 133, and extends along a second link longitudinal axis 139 between the first end 132 and an opposite second end 134. In the illustrated form, the second link first end 132 is configured for coupling to the trailer 90. It is also contemplated that the second link first end 132 may be configured for coupling to other types of agricultural equipment, such as a tractor or other towing vehicle. The second ends 124, 134 of the first link 120 and the second link 130 are pivotably joined to one another via a pivot pin 102 that extends into the slot 142 of the support plate 140.

Figure 4:
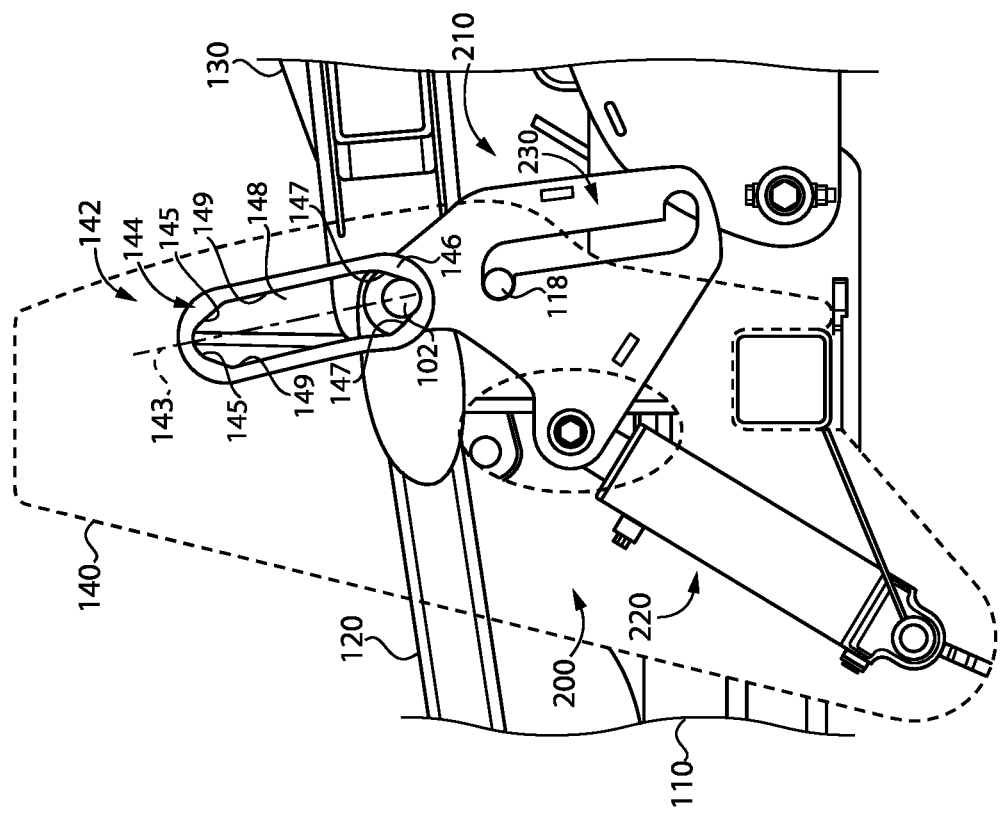
FIG. 4 is a side view of a portion of the hitch assembly that includes an actuator mechanism according to certain embodiments.

With additional reference to FIG. 4, the support plate 140 is mounted to the base portion 112 and extends upward from the base portion 112. The support plate 140 includes a support plate slot 142 having a first or upper end portion 144, a second or lower end portion 146 opposite the first end portion 144, and a central portion 148 extending between and connecting the upper end portion 144 and the lower end portion 146. The upper end portion 144 is defined in part by a pair of tapered edges 145 that taper outward such that a closed upper end of the upper end portion 144 has a width corresponding to the diameter of the pivot pin 102 and an open lower end of the upper end portion 144 has a greater width than the diameter of the pivot pin 102. Similarly, the lower end portion 146 is defined in part by a pair of tapered edges 147 that taper outward such that a closed lower end of the lower end portion 146 has a width corresponding to the diameter of the pivot pin 102 and an upper open end of the lower end portion 146 has a greater width than the diameter of the pivot pin 102. The central portion 148 is defined by a pair of edges 149 that extend between and connect the tapered edges 145, 147 such that the central portion has a width corresponding to the widths of the open ends of the end portions 144, 146. A central axis 143 of the slot 142 is defined between the edges 149. In the illustrated form, the central axis 143 is arcuate. In other embodiments, the central axis 143 may be straight.

Figure 5:
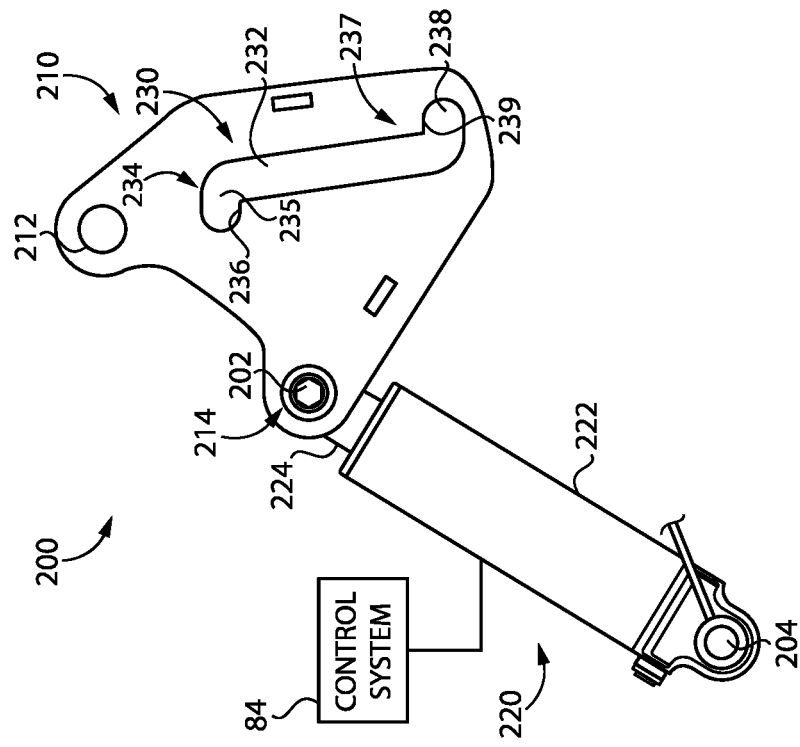
FIG. 5 illustrates the actuator mechanism.

With additional reference to FIG. 5, the actuator mechanism 200 generally includes a floating plate 210 and an actuator 220 that is mounted to the main frame 110 and connected with the floating plate 210. As described herein, the actuator 220 is operable to drive the floating plate 210 between a first plate position and a second plate position to thereby move the hitch assembly 100 between a first state and a second state.

The floating plate 210 includes a first pivotal connection aperture 212, a second pivotal connection aperture 214, and a locking slot 230 that receives the projection 118 of the main frame 110. The floating plate 210 is pivotably connected to the first link 120 and the second link 130. While other forms are contemplated, in the illustrated form, the floating plate 210 is pivotably coupled to the links 120, 130 by the pivot pin 102, which is pivotably engaged with the first pivotal connection aperture 212. The floating plate 210 is also pivotably connected to the actuator 220 by a second pivot pin 202 that passes through the second pivotal connection aperture 214.

The actuator 220 is mounted to the main frame 110, and generally includes a body portion 222 and a shaft 224 extending from the body portion 222. When the hitch assembly 100 is installed to the agricultural equipment 80, the actuator 220 may be connected with a control system 84 of the agricultural equipment 80. When so connected, the control system 84 is operable to control operation of the actuator 220 to cause the shaft 224 to move relative to the body portion 222 between an extended position and a retracted position. In the illustrated form, the actuator 220 is provided as a hydraulic cylinder that causes the shaft 224 to extend and retract by charging a hydraulic fluid into and out of the body portion 222. In other embodiments, the actuator 220 may be provided as another form of linear actuator, such as a solenoid or a linear motor. In the illustrated form, the body portion 222 is pivotably coupled to the main frame 110, for example by a third pivot pin 204, and the shaft 224 is pivotably connected to the floating plate 210 via the second pivot pin 202.

The locking slot 230 receives the projection 118 of the main frame 110, and generally includes a longitudinally-extending central portion 232, a first or upper end portion 234 positioned above the central portion 232, and a second or lower end portion 237 positioned below the central portion 232. In the illustrated form, the upper end portion 234 defines a first or upper jog 235 that is defined in part by a first edge 236, and the lower end portion 237 defines a second or lower jog 238 that is defined in part by a second edge 239. Each of the jogs 235, 238 extends laterally from corresponding end of the central portion 232. More particularly, the upper jog 235 extends laterally from the upper end of the central portion 232, and the lower jog 238 extends laterally from the lower end of the central portion 232. In the illustrated form, the jogs 235, 238 extend from the central portion 232 in opposite directions such that the locking slot 230. While the illustrated locking slot 230 generally S-shaped geometry, it is also contemplated that the locking slot 230 may have another geometry, such as a generally Z-shaped geometry.

Figure 6:
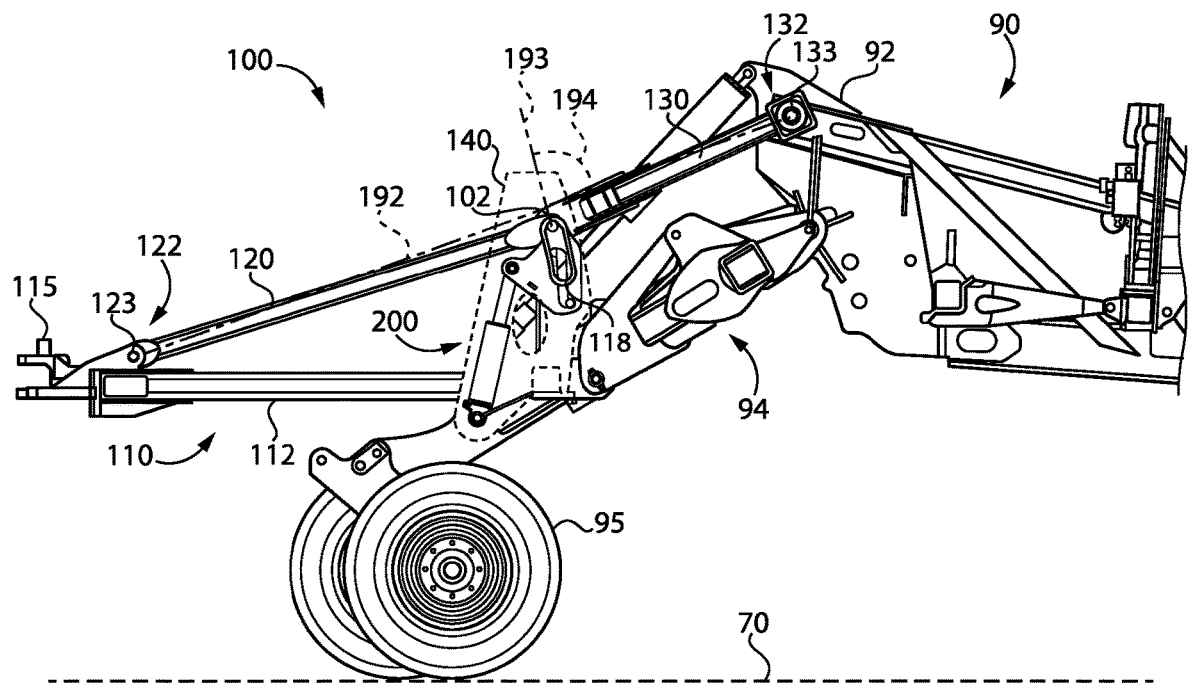
FIG. 6 illustrates the hitch assembly coupled to agricultural equipment in a first state.
Figure 7:
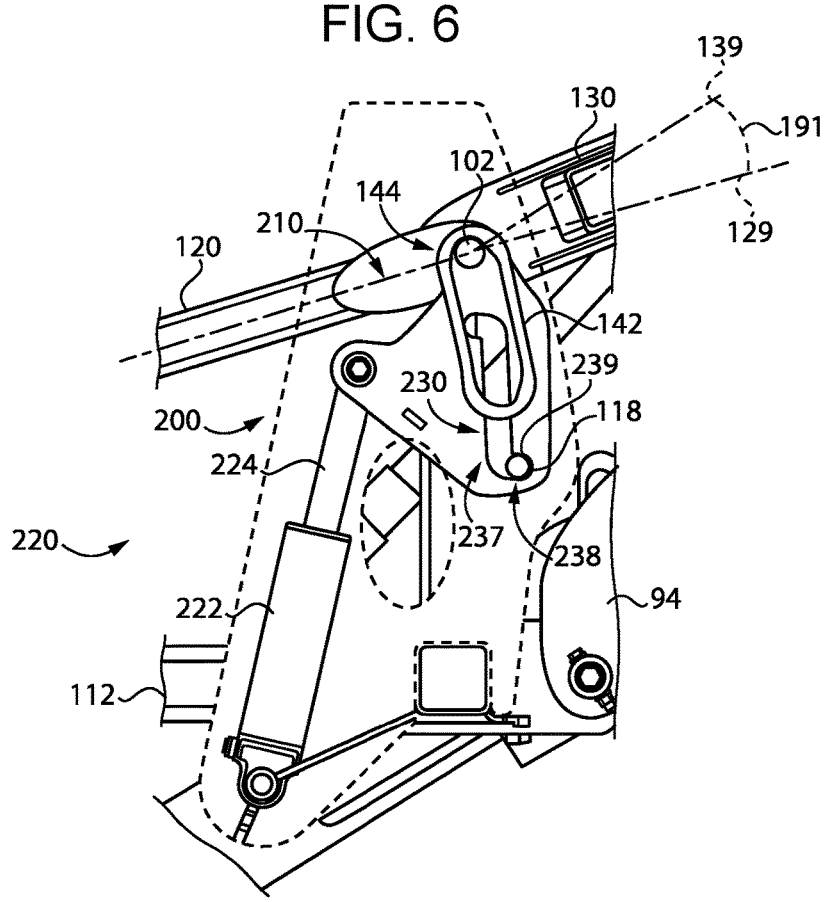
FIG. 7 illustrates the actuator mechanism with the hitch assembly in the first state.

With additional reference to FIGS. 6 and 7, illustrated therein are the hitch assembly 100 and a portion of the trailer 90 with the agricultural equipment 80 in a first configuration. The first configuration may, for example, be utilized to transport the agricultural equipment 80 along a road, and may be referred to herein as the road transportation configuration. When the hitch assembly 100 is installed to the trailer 90, the first end portion 132 of the second link 130 is pivotably connected to a frame 92 of the trailer 90, and the frame 112 is pivotably connected to the second end portion 116, which is fixedly connected to the armature 94. The armature 94 is pivotably mounted to the trailer frame 92, and a ground interface mechanism is mounted to an end of the armature 94. In the illustrated embodiment, the ground interface mechanism comprises one or more wheels 95, which are rotatably mounted to an end of the armature 94. It is also contemplated that the ground interface mechanism may take another form, such as one comprising skids.

With the agricultural equipment 80 in the first or road transportation configuration, the armature 94 is angled downward toward the ground 70 such that the wheels 95 are in contact with the ground 70. Additionally, the actuator mechanism 200 is in a first locking state, in which the shaft 224 has been extended to place the floating plate 210 in a first plate position. With the actuator mechanism 200 in its first locking state, the pivot pin 102 is received in the upper end portion 144 of the support plate slot 142, and may abut the upper end of the slot 142. Additionally, the projection 118 is received in the lower end portion 237 of the locking slot 230, and more particularly is received in the lower jog 238. As a result, a downward force exerted on the pivot pin 102 by the links 120, 130 will be countered by the edge 239 of the lower jog 238 such that the exerted force is borne substantially entirely by the floating plate 210, and is not transmitted to the actuator 220. Conversely, an upward force exerted on the pivot pin 102 by the links 120, 130 may be countered by the upper edge of the support plate slot 142 and/or the lower edge 238 of the locking slot 230 to prevent force transmission to the actuator 220.

During road transportation, it may be the case that the driver of the vehicle towing the trailer 90 and cart 82 via the hitch assembly 100 brakes suddenly or accelerates sharply. Those skilled in the art will readily appreciate that in such an event, forces will be transmitted between the towed vehicle and the hitch assembly 100 via the hitch 115. Should the cart tongue 81 and the hitch assembly 100 be significantly misaligned, the transmitted forces will tend to urge the front or rear end of the trailer 90 upward or downward, which may cause the trailer 90 to pivot undesirably relative to the ground 70. However, the arrangement of the hitch assembly 100 when in the road transport configuration may reduce or eliminate such undesirable pivoting. More particularly, the relative dimensions of the various components of the hitch assembly 100 may be selected such that when the agricultural equipment 80 is in the first configuration, the links 120, 130 are substantially aligned. For example, an angle 191 formed between the first link longitudinal axis 129 and the second link longitudinal axis 139 may be about 10° or less. As such, the links 120, 130 may be considered to be substantially parallel.

Those skilled in the art will further recognize that should a force be applied to the pivot pin 102 as a result of a moment on the links 120, 130, such a force will be perpendicular to a line 192 extending between the first pivot axis 123 of the first link 120 and the first pivot axis 133 of the second link 130. Moreover, such a force may result in the pivot pin 102 exerting on the floating plate 210 a moment about the projection 118. In the illustrated form, however, the generation of such a moment is reduced or eliminated by the relative orientations of the various components of the hitch assembly 100. More particularly, the line 192 is substantially perpendicular to a line 193 extending between the pivot pin 102 and the projection 118 such that the lines 192, 193 define an angle that is about 90° (e.g., between 80° and 100° or between 85° and 95°).

As a result of the relative orientation of the lines 192, 193, the force vector generated by the links 120, 130 intersects or nearly intersects the projection 118 such that the force vector is countered by a corresponding force vector exerted by the edge 239 of the jog 238, and little to no moment about the projection 118 is generated on the floating plate 210. Thus, the floating plate 210 exerts little to no force on the shaft 224 of the actuator 220, and the actuator 220 therefore need not counter such a force. Stated another way, the forces exerted by the links 120, 130 when the agricultural equipment 80 is in the first configuration are borne substantially entirely by the floating plate 210, and are not transmitted to the actuator 220. Accordingly, the actuator 220 may be idle when the hitch assembly 100 is in its first state.

Figure 8:
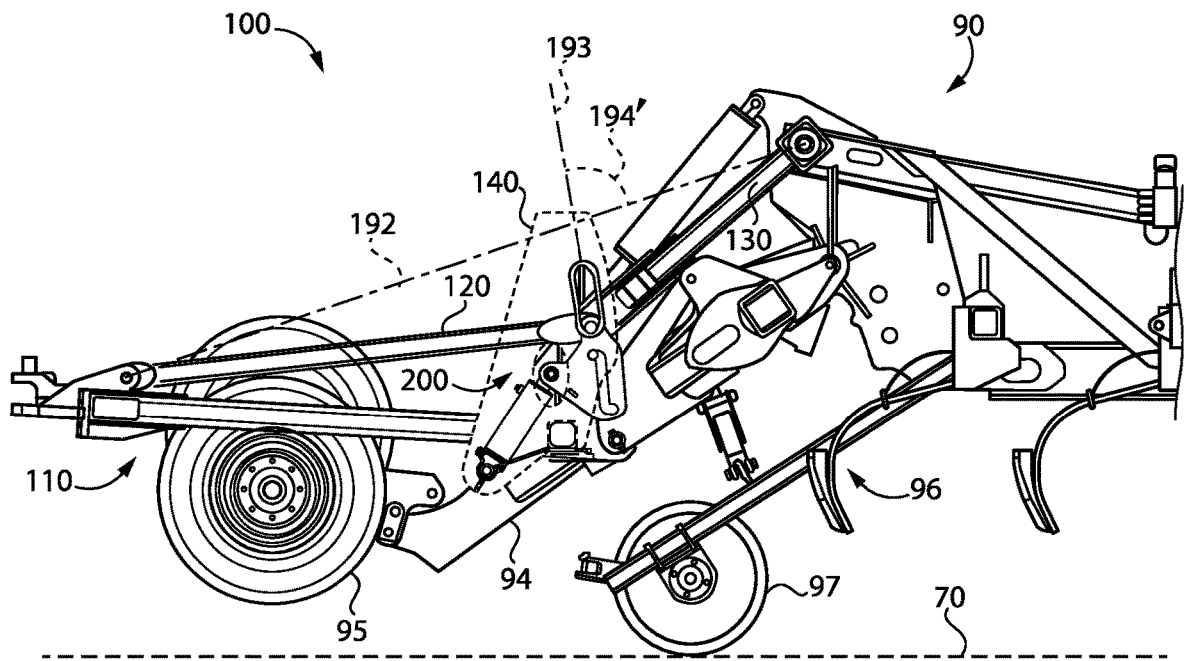
FIG. 8 illustrates the hitch assembly coupled to agricultural equipment in a second state.
Figure 9:
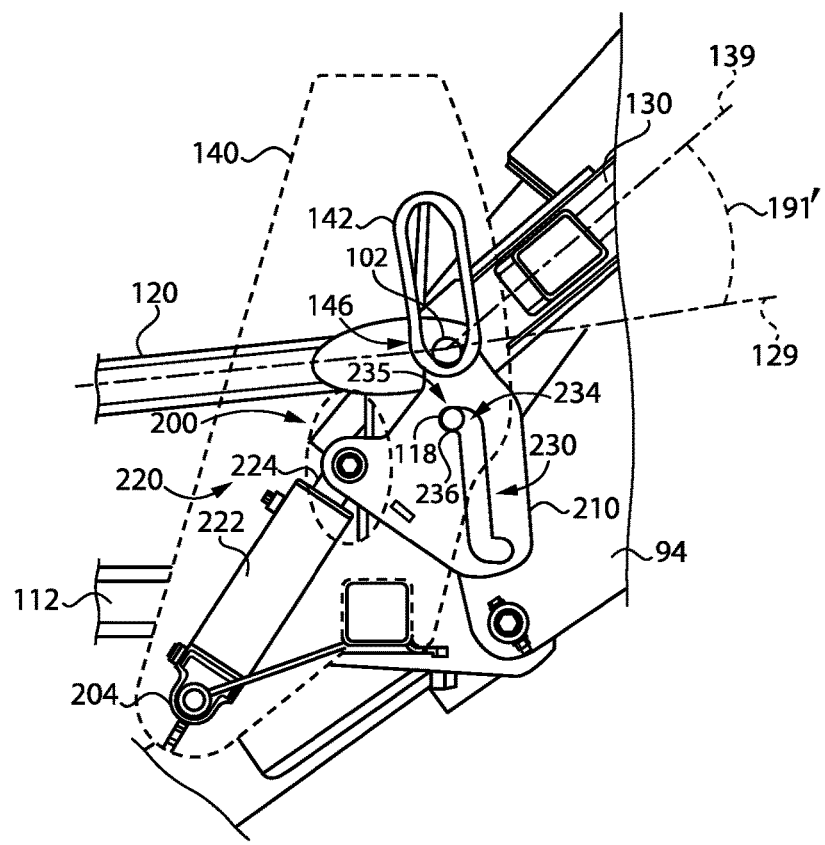
FIG. 9 illustrates the actuator mechanism with the hitch assembly in the second state.

With additional reference to FIGS. 8 and 9, illustrated therein are the hitch assembly 100 and a portion of the trailer 90 with the agricultural equipment 80 in a second configuration. The second configuration may, for example, be utilized to transport the agricultural equipment 80 across unpaved terrain, and may be referred to herein as the field transportation configuration. With the agricultural equipment 80 in the second configuration, the ground interface armature 94 has been pivoted upward such that the wheels 95 are removed from the ground 70, and another armature 96 has been pivoted downward to place pressure rollers 97 in contact with the ground 70. Additionally, the actuator mechanism 200 has been placed in a second locking state, in which the shaft 224 has been retracted to place the floating plate 210 in a second plate position. Further, the first link 120 and the second link 130 define a second angle 191' that is an oblique angle and may, for example, be about 30°.

With the actuator mechanism 200 in its second locking state, the pivot pin 102 is received in the lower end portion 146 of the support plate slot 142, and may abut the lower edge of the slot 142. Additionally, the projection 118 is received in the upper end portion 234 of the locking slot 230, and more particularly is received in the upper jog 235. As a result, an upward force exerted on the pivot pin 102 by the links 120, 130 will be countered by the edge 236 of the upper jog 235 such that the exerted force is borne substantially entirely by the floating plate 210, and is not transmitted to the actuator 220. Conversely, a downward force exerted on the pivot pin 102 by the links 120, 130 may be countered by the lower edge of the support plate slot 142 and/or the upper edge of the locking slot 230 to prevent force transmission to the actuator 220.

As noted above, should a force be applied to the pivot pin 102 as a result of a moment exerted on the links 120, 130, such a force will be perpendicular to the line 192 extending between the first pivot axis 123 of the first link 120 and the first pivot axis 133 of the second link 130. Moreover, such a force may result in the pivot pin 102 exerting on the floating plate 210 a moment about the projection 118. In the illustrated form, however, the generation of such a moment is reduced or eliminated by the relative orientations of the various components of the hitch assembly 100. More particularly, when the hitch assembly 100 is in its second state, the line 192 is once again substantially perpendicular to the line 193 extending between the pivot pin 102 and the projection 118 such that the lines 192, 193 define an angle 194' of about 90° (e.g., between 80° and 100° or between 85° and 95°).

As a result of the relative orientation of the lines 192, 193, the force vector generated by the links 120, 130 intersects or nearly intersects the projection 118 such that the force vector is countered by a corresponding force vector exerted by the edge 236 of the jog 235, and little to no moment about the projection 118 is generated on the floating plate 210. Thus, the floating plate 210 exerts little to no force on the shaft 224 of the actuator 220, and the actuator 220 therefore need not counter such a force. Stated another way, the forces exerted by the links 120, 130 when the agricultural equipment 80 is in the second configuration are borne substantially entirely by the floating plate 210, and are not transmitted to the actuator 220. Accordingly, the actuator 220 may be idle when the hitch assembly 100 is in its second state.

Figure 10:
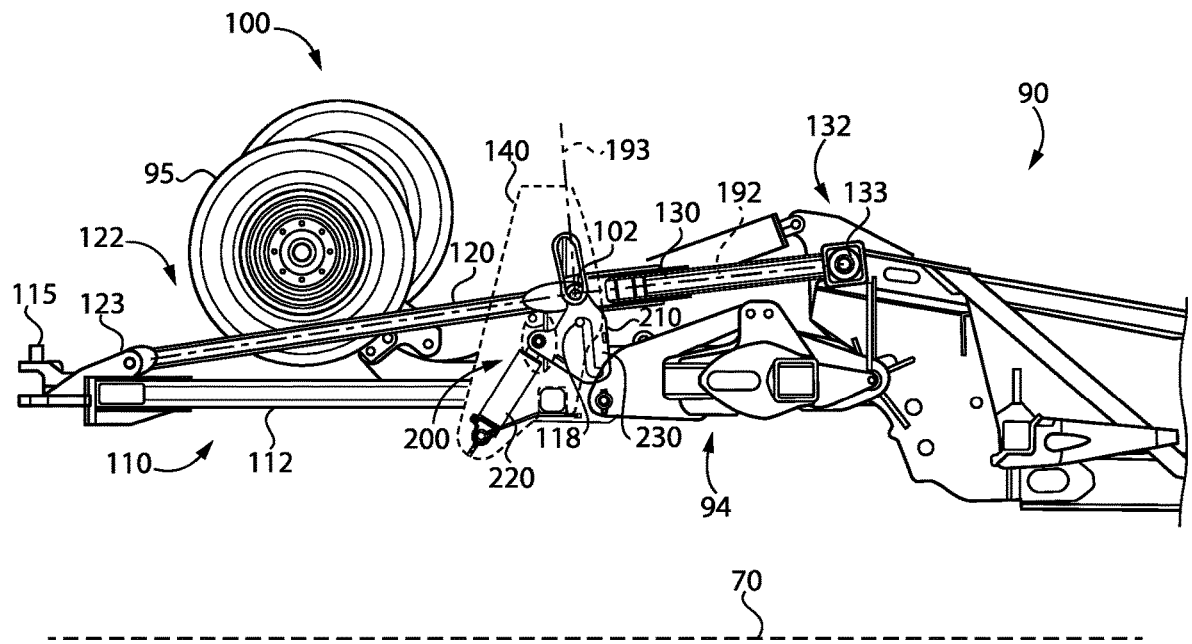
FIG. 10 illustrates the hitch assembly coupled to agricultural equipment in a third state.
Figure 11:
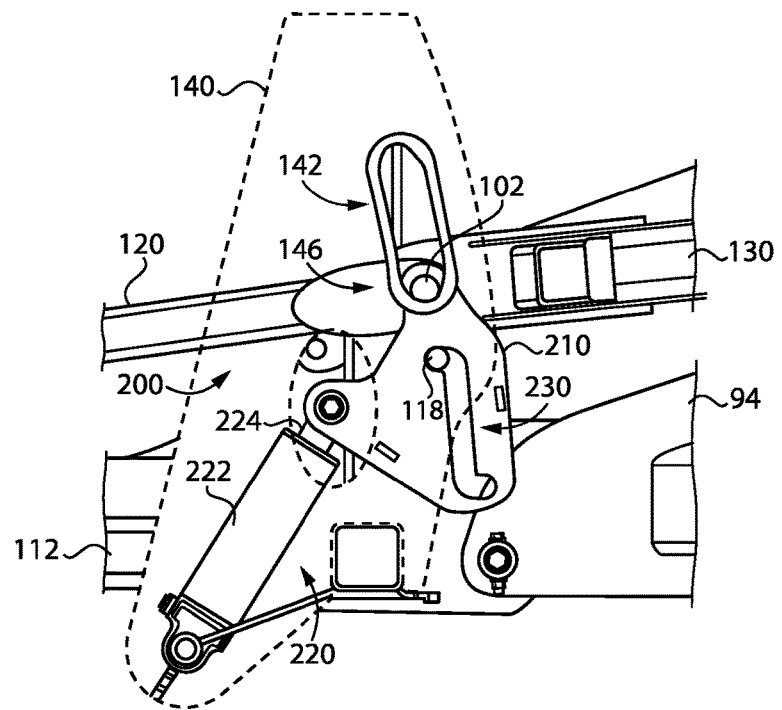
FIG. 11 illustrates the actuator mechanism with the hitch assembly in the third state.

With additional reference to FIGS. 10 and 11, illustrated therein are the hitch assembly 100 and a portion of the trailer 90 with the agricultural equipment 80 in a third configuration. The third configuration may, for example, be utilized while the trailer 90 is being operated in its primary function (e.g., distributing agricultural product or tilling), and may be referred to herein as the operational configuration. With the agricultural equipment 80 in the third configuration, the ground interface armature 94 has been pivoted further upward such that the armature 94 is substantially parallel to the ground 70. Additionally, the actuator mechanism 200 has been placed in its second locking state, and the links 120, 130 are substantially parallel to one another such that each of the axes 129, 139 is substantially collinear with the line 192.

As with the first configuration and the second configuration, the line 192 extending between the pivot axes 123, 133 of the links 120, 130 is substantially perpendicular to the line 193 extending between the pivot pin 102 and the projection 118. As a result, upward forces exerted on the pivot pin 102 by the links 120, 130 will not result in a moment about the projection 118 for reasons analogous to those set forth above. Additionally, downward forces exerted on the pivot pin 102 by the links 120 will be countered by the lower edge of the support plate slot 142 and/or the upper edge of the locking slot 230. As such, the loads are borne by the main frame 110 and the floating plate 210, and are not transmitted to the actuator 220. Thus, the actuator 220 may remain idle while the agricultural equipment 80 is in its third configuration.

Figure 14:
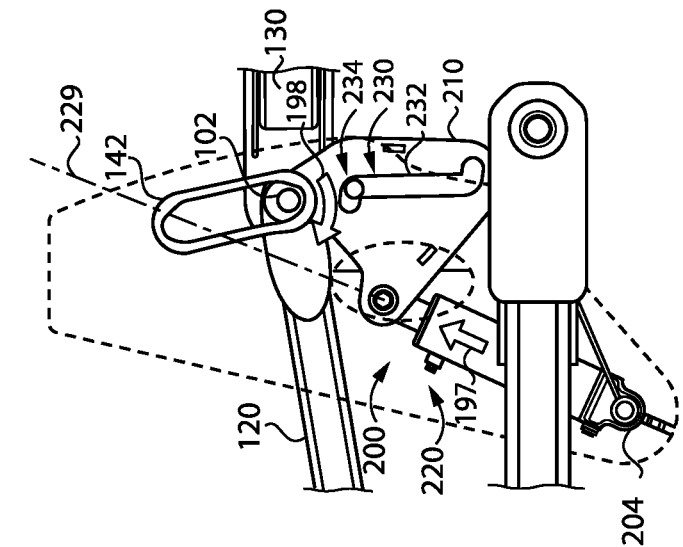
FIGS. 12-14 illustrate the actuator mechanism in various transitional states.
Figure 13:
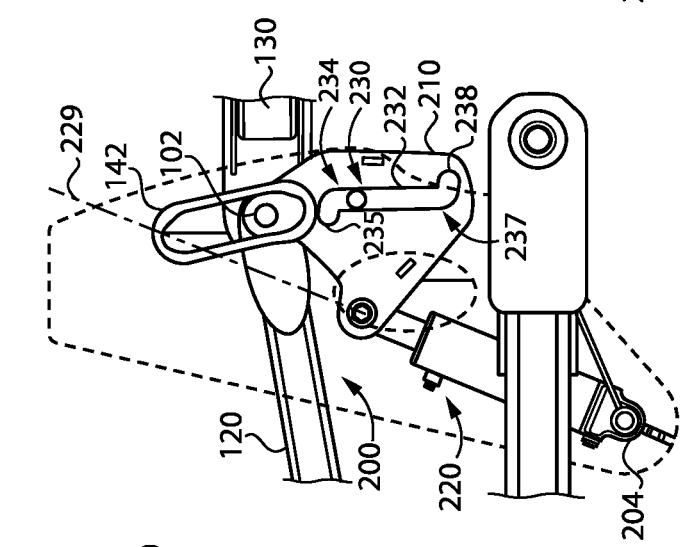
Figure 12:
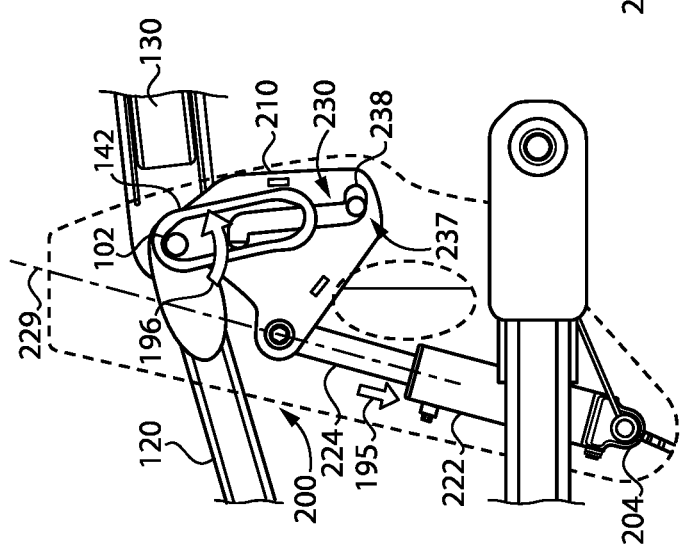

With additional reference to FIGS. 12-14, illustrated therein is the actuator mechanism 200 during various stages of movement between its first state (FIG. 7) and its second state (FIG. 9). During operation, the hitch assembly 100 may begin with the actuator mechanism 200 in its first locking state, for example if the agricultural equipment 80 is in its road transportation configuration (FIG. 6). From the first locking state (FIG. 7), the actuator mechanism 200 may be moved to its second locking state (FIG. 9) by operating the actuator 220 to retract the shaft 224 from its extended position to its retracted position. Such actuation causes the actuator 220 to exert a retracting force 195 on the floating plate 210 along a force axis 229 that extends along the longitudinal axis of the shaft 224. Due to the fact that the force axis 229 does not intersect the pivot pin 102, the retracting force 195 supplied by the actuator 220 results in a first moment 196 about the pivot pin 102, the first moment 196 urging the floating plate 210 toward the second plate position.

As the first moment 196 urges the floating plate 210 toward the second plate position, the projection 118 exits the lower jog 238 (FIG. 12), thereby freeing the floating plate 210 from its first locked position. The floating plate 210 is thus able to slide downward as the central portion 232 of the locking slot 230 travels along the projection 118 and the pivot pin 102 travels within the support plate slot 142 (FIG. 13). Such downward movement of the pivot pin 102 drives the links 120, 130 from the first relative orientation, in which the links 120, 130 are substantially parallel to one another (FIGS. 6 and 7) and define a first angle 191 (e.g., an angle of about 10° or less), toward a second relative orientation, in which the links 120, 130 are obliquely offset from one another (FIGS. 8 and 9) and define a second angle 191' (e.g., an angle of about 30°). Continued movement of the floating plate 210 toward its second position causes the projection 118 to enter the upper end portion 234 of the locking slot 230 (FIG. 14), and to thereafter enter the upper jog 235 to place the floating plate 210 in its second locked position, thereby setting the actuator mechanism 200 to its second locking state.

From the second locking state (FIG. 9), the actuator mechanism 200 may be moved to its first locking state (FIG. 7) by operating the actuator 220 to extend the shaft 224 from its retracted position to its extended position. Such actuation of the actuator 220 causes the actuator 220 to exert an extending force 197 on the floating plate 210 along the force axis 229. Due to the fact that the force axis 229 does not intersect the pivot pin 102, the extending force 197 supplied by the actuator 220 results in a second moment 198 about the pivot pin 102, the second moment 198 urging the floating plate 210 toward the first plate position.

As the second moment 198 urges the floating plate 210 toward the first plate position, the projection 118 exits the upper jog 235 (FIG. 14), thereby freeing the floating plate 210 from its second locked position. The floating plate 210 is thus able to slide upward as the central portion 232 of the locking slot 230 travels along the projection 118 and the pivot pin 102 travels within the support plate slot 142 (FIG. 13). Such upward movement of the pivot pin 102 drives the links 120, 130 from the second relative orientation, in which the links 120, 130 are obliquely offset from one another (FIGS. 8 and 9) and define a second angle 191' (e.g., an angle of about 30°), toward the first relative orientation, in which the links 120, 130 are substantially parallel to one another (FIGS. 6 and 7) and define a first angle 191 (e.g., an angle of about 10° or less). Continued movement of the floating plate 210 toward its first position causes the projection 118 to enter the lower end portion 237 of the locking slot 230 (FIG. 12), and to thereafter enter the lower jog 238 to place the floating plate 210 in its first locked position, thereby setting the actuator mechanism 200 to its first locking state.

As should be evident from the foregoing, the actuator mechanism 200 is operable to move between its first locking state and its second locking state by controlling the actuator 220 to extend and retract the shaft 224, for example under the control of the control system 84. During such extension and retraction of the shaft 224, the floating plate 210 moves between the first plate position and the second plate position, thereby causing the pivot pin 102 to travel upward and downward within the support plate slot 142. As described herein, one or more features of the hitch assembly 100 may facilitate this transitioning while discouraging binding during movement of the actuator mechanism 200 between the first locking state and the second locking state.

As noted above, the support plate slot 142 expands from a first width at the upper and lower ends thereof such that the central portion 148 has a width significantly greater than the diameter of the head of the pivot pin 102. In certain embodiments, the width of the central portion 148 may be 50% to 100% greater than the diameter of the portion of the pivot pin 102 that is received in the slot 142. This increased width of the central portion 148 allows some degree of play in the motion of the pivot pin 102 such that the pivot pin 102 is able to move between its upper and lower positions without engaging either edge 149 of the central portion 148, which engagement may cause the actuator mechanism 200 to bind up.

Another feature of the actuator mechanism 200 that may aid in discouraging binding relates to the extension of the force axis 229 relative to the pivot pin 102. During movement of the actuator mechanism 200 between its first locking state and second locking state, the actuator 220 may pivot relative to the support plate 140 (for example as illustrated in FIGS. 12-14), thereby rotating the force axis 229 about the pivot pin 204. Those skilled in the art will readily recognize that, should the force axis 229 come close to intersecting the pivot pin 102 (e.g., within about 2°), the actuator 220 may be unable to exert the appropriate moment 196, 198 about the pivot pin 102. However, the actuator mechanism 200 may be arranged such that the force axis 229 does not intersect the pivot pin 102 at any point during the travel of the pivot pin 102 between its upper and lower positions, thereby facilitating the continued exertion of a moment about the pivot pin 102 by the actuator 220.

Figure 15:
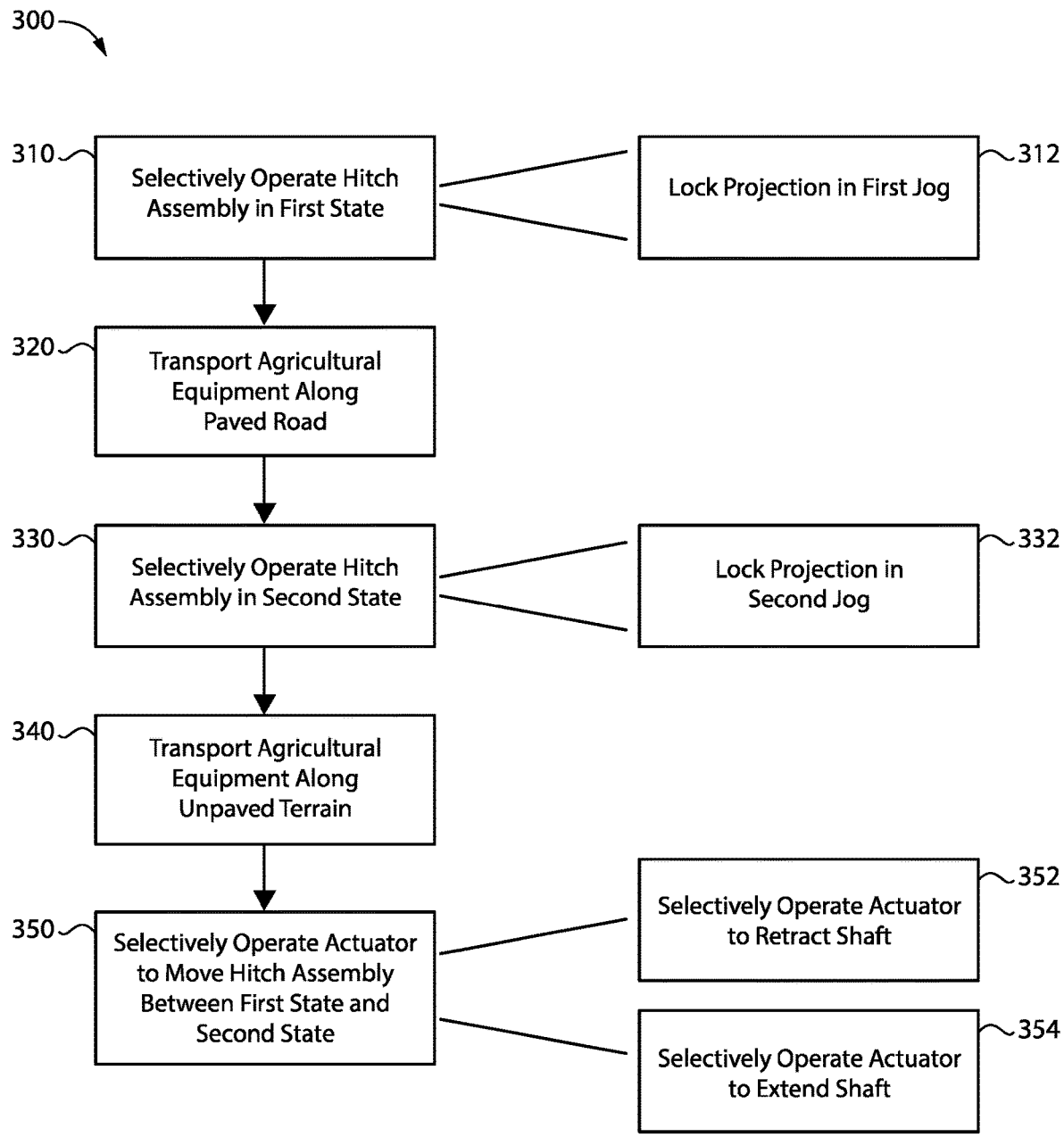
FIG. 15 is a schematic block diagram of a process according to certain embodiments.

With additional reference to FIG. 15, an exemplary process 300 that may be performed using the hitch assembly 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the agricultural equipment 80 and hitch assembly 100 illustrated in FIGS. 1-14, it is to be appreciated that the process 300 may be performed with agricultural equipment and/or hitch assemblies having additional or alternative features.

In certain embodiments, the process 300 may be performed using a hitch assembly comprising a main frame, a first link pivotably coupled to the main frame, a second link pivotably coupled to the first link via a pivot pin, a floating plate, and an actuator operably coupled with the floating plate, wherein a projection of the main frame extends into a locking slot of the floating plate. For example, the process 300 may be performed using the hitch assembly 100, which generally includes a main frame 110, a first link 120 pivotably coupled to the main frame 110, a second link 130 pivotably coupled to the first link 120 via a pivot pin 102, a floating plate 210, and an actuator 220 operably coupled with the floating plate 210, wherein a projection 118 of the main frame 110 extends into a locking slot 230 of the floating plate 210. Moreover, the process 300 may be performed with agricultural equipment comprising a first piece of agricultural equipment and a second piece of agricultural equipment, wherein the first and second pieces of the agricultural equipment are operably coupled by the hitch assembly. For example, the process 300 may be performed with the agricultural equipment 80, which includes a cart 82 and a trailer 90 operably coupled by the hitch assembly 100. It is also contemplated that the hitch assembly 100 may be utilized to couple the cart 82 or the trailer 90 to a tractor or other towing vehicle.

The process 300 includes block 310, which generally involves selectively operating the hitch assembly in a first state. For example, block 310 may involve operating the hitch assembly 100 in the first state illustrated in FIGS. 6 and 7, in which the actuator 220 is in its extended state to place the floating plate 210 in its first plate position, thereby defining the first locking state of the actuator mechanism 200. Block 310 includes block 312, which generally involves locking the projection in a first jog of the locking slot to thereby lock the first link and the second link at a first angle relative to one another. For example, block 312 may involve locking the projection 118 in the lower jog 238 of the locking slot 230 to thereby lock the first link 120 and the second link 130 at a first angle 191 relative to one another as described above.

In certain embodiments, the process 300 may include block 320, which generally involves transporting the agricultural equipment along a paved roadway while operating the hitch assembly in the first state. For example, block 320 may involve transporting the agricultural equipment 80 along a paved roadway while operating the hitch assembly 100 in the road transportation configuration illustrated in FIGS. 6 and 7.

The process 300 also includes block 330, which generally involves selectively operating the hitch assembly in a second state. For example, block 330 may involve operating the hitch assembly 100 in the second state illustrated in FIGS. 8 and 9, in which the actuator 220 is in its retracted state to place the floating plate 210 in its second plate position, thereby defining the second locking state of the actuator mechanism 200. Block 330 includes block 332, which generally involves locking the projection in a second jog of the locking slot to thereby lock the first link and the second link at a second angle relative to one another. For example, block 332 may involve locking the projection 118 in the upper jog 235 of the locking slot 230 to thereby lock the first link 120 and the second link 130 at a second angle 191' relative to one another.

In certain embodiments, the process 300 may include block 340, which generally involves transporting the agricultural equipment along unpaved terrain while operating the hitch assembly in the second state. For example, block 340 may involve transporting the agricultural equipment 80 along unpaved terrain while operating the hitch assembly 100 in the field transportation configuration illustrated in FIGS. 8 and 9.

The process 300 further include block 350, which generally involves selectively operating the actuator to move the hitch assembly between its first state and its second state. For example, block 350 may involve operating the actuator 220 to move the hitch assembly 100 between the first state illustrated in FIGS. 6 and 7 and the second state illustrated in FIGS. 8 and 9. As will be appreciated, block 350 may be performed between block 310 and block 330 to transition the hitch assembly between the first state utilized in blocks 310 and 320 and the second state utilized in blocks 330 and 340.

In certain circumstances, block 350 may involve block 352, which generally involves selectively operating the actuator 220 to retract the actuator shaft 224. For example, when the actuator mechanism 200 is in the first locking state (FIG. 7), retracting the shaft 224 causes the lower jog 238 to disengage from the projection 118 (FIG. 12), after which the central portion 232 of the locking slot 230 travels downward along the projection 118 (FIG. 13). Thereafter, the upper end portion 234 of the locking slot 230 receives the projection 118 (FIG. 13), and the floating plate 210 pivots to cause the upper jog 235 to receive the projection 118, thereby providing the actuator mechanism 200 with its second locking state (FIG. 9). As will be appreciated, operation of the actuator mechanism 200 in block 352 may be controlled by the control system 84 of the agricultural equipment 80 to drive the hitch assembly 100 from the first state utilized in block 310 to the second state utilized in block 330, thereby preparing the agricultural equipment for field transport in block 340.

In certain circumstances, block 350 may involve block 354, which generally involves selectively operating the actuator 220 to extend the actuator shaft 224. For example, when the actuator mechanism 200 is in the second locking state (FIG. 9), extending the shaft 224 causes the upper jog 235 to disengage from the projection 118 (FIG. 14), after which the central portion 232 of the locking slot 230 travels upward along the projection 118 (FIG. 13). Thereafter, the lower end portion 237 of the locking slot 230 receives the projection 118 (FIG. 12), and floating plate 210 pivots to cause the lower jog 238 to receive the projection 118, thereby providing the actuator mechanism 200 with its first locking state (FIG. 7). As will be appreciated, operation of the actuator mechanism 200 in block 354 may be controlled by the control system 84 of the agricultural equipment 80 to drive the hitch assembly 100 from the second state utilized in block 330 to the first state utilized in blocks 310, thereby preparing the agricultural equipment for road transport in block 320.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A hitch assembly, comprising:
   a main frame comprising a projection;
   a first link pivotably coupled to the main frame;
   a second link pivotably coupled to the first link by a pivot pin; and
   a self-locking actuator mechanism, comprising:
      a floating plate defining a first slot, the first slot comprising a first central portion, a first jog extending laterally from a first end of the first central portion, and a second jog extending laterally from a second end of the first central portion, wherein the projection extends into the first slot, and wherein the floating plate is pivotably coupled to the first link and the second link; and
      a linear actuator mounted to the main frame, the linear actuator comprising a shaft pivotably connected to the floating plate;
   wherein the hitch assembly has a first state in which the shaft is in a first shaft position, the floating plate is in a first plate position, and the projection is received in the first jog to thereby lock the first link and the second link at a first relative orientation;
   wherein the hitch assembly has a second state in which the shaft is in a second shaft position, the floating plate is in a second plate position, and the projection is received in the second jog to thereby lock the first link and the second link at a second relative orientation different from the first relative orientation; and
   wherein the linear actuator is operable to drive the shaft between the first shaft position and the second shaft position to thereby move the hitch assembly between the first state and the second state.

2. The hitch assembly of claim 1, wherein the main frame comprises a base frame and a support plate extending upward from the base frame, the support plate comprising a second slot having an upper end portion, a lower end portion, and a second central portion extending between and connecting the upper end portion and the lower end portion;
   wherein the pivot pin extends into the second slot;
   wherein, with the hitch assembly in the first state, the pivot pin is received in the lower end portion of the second slot;
   wherein, with the hitch assembly in the second state, the pivot pin is received in the upper end portion of the second slot.

3. The hitch assembly of claim 1, wherein the first jog and the second jog extend from the first central portion in opposite directions.

4. The hitch assembly of claim 1, wherein the first link and the second link define an angle of 10° or less when the hitch assembly is in the first state.

5. Agricultural equipment comprising the hitch assembly of claim 1, and further comprising:
a first piece of mobile agricultural equipment;
a second piece of mobile agricultural equipment connected to the first piece of mobile agricultural equipment via the hitch assembly; and
a control system in communication with the linear actuator, wherein the control system is operable to control the linear actuator to move the shaft between the first shaft position and the second shaft position to thereby transition the hitch assembly between the first state and the second state.

6. A hitch assembly, comprising:
a main frame comprising a projection;
a first link pivotably coupled to the main frame;
a second link pivotably coupled to the first link by a pivot pin; and
an actuator mechanism, comprising:
a floating plate having a first slot formed therein, wherein the first slot comprises a first upper end portion, a first lower end portion, and a first central portion extending between and connecting the first upper end portion and the first lower end portion, wherein the projection extends into the first slot, and wherein the floating plate is pivotably coupled to the first link and the second link via the pivot pin; and
a linear actuator mounted to the main frame, the linear actuator comprising a shaft pivotably connected to the floating plate;
wherein the hitch assembly has a first state in which the shaft is in a first shaft position, the floating plate is in a first plate position, the projection is received in the first upper end portion, and the first link and the second link define a first angle;
wherein the hitch assembly has a second state in which the shaft is in a second shaft position, the floating plate is in a second plate position, the projection is received in the first lower end portion, and the first link and the second link define a second angle different from the first angle; and
wherein the linear actuator is operable to drive the shaft between the first shaft position and the second shaft position to thereby move the hitch assembly between the first state and the second state.

7. The hitch assembly of claim 6, wherein the first upper end portion defines a first jog extending laterally from the first central portion; and
wherein, with the hitch assembly in the first state, the projection is received in the first jog such that a first load exerted on the pivot pin is borne by the floating plate.

8. The hitch assembly of claim 7, wherein the first lower end portion defines a second jog extending laterally from the first central portion; and
wherein, with the hitch assembly in the second state, the projection is received in the second jog such that a second load exerted on the pivot pin is borne by the floating plate.

9. The hitch assembly of claim 8, wherein the first jog and the second jog extend from the central portion in opposite directions.

10. The hitch assembly of claim 6, wherein the first lower end portion defines a jog extending laterally from the first central portion; and
wherein, with the hitch assembly in the second state, the projection is received in the jog such that a load exerted on the pivot pin is borne by the floating plate.

11. The hitch assembly of claim 6, wherein the first link includes a first link first end pivotably coupled to the main frame and a first link second end opposite the first link first end;
wherein the second link includes a second link first end configured for coupling with agricultural equipment and a second link second end opposite the second link first end;
wherein the first link second end and the second link second end are pivotably coupled to one another by the pivot pin; and
wherein a first line of action extending between the first link first end and the second link first end is substantially perpendicular to a second line of action extending between the pivot pin and the projection when the hitch assembly is in the first state and when the hitch assembly is in the second state.

12. The hitch assembly of claim 6, wherein the main frame comprises a base frame and a support plate extending upward from the base frame, the support plate comprising a second slot having a second upper end portion, a second lower end portion, and a second central portion extending between and connecting the second upper end portion and the second lower end portion;
wherein the pivot pin extends into the second slot;
wherein, with the hitch assembly in the first state, the pivot pin is received in the second lower end portion;
wherein, with the hitch assembly in the second state, the pivot pin is received in the second upper end portion.

13. The hitch assembly of claim 12, wherein a width of the second central portion is greater than a diameter of the pivot pin; and
wherein the pivot pin does not touch either edge of the second central portion during movement of the hitch assembly between the first state and the second state.

14. The hitch assembly of claim 12, wherein each of the second upper end portion and the second lower end portion is tapered such that the second central portion has a greater width than each of the second upper end portion and the second lower end portion.

15. A method of operating a hitch assembly comprising a main frame, a first link pivotably coupled to the main frame, a second link pivotably coupled to the first link via a pivot pin, a floating plate, and an actuator operably coupled with the floating plate, wherein a projection of the main frame extends into a locking slot of the floating plate, the method comprising:
selectively operating the hitch assembly in a first state, wherein selectively operating the hitch assembly in the first state comprises locking the projection in a first jog of the locking slot to thereby lock the first link and the second link at a first angle relative to one another;
selectively operating the hitch assembly in a second state, wherein selectively operating the hitch assembly in the second state comprises locking the projection in a second jog of the locking slot to thereby lock the first link and the second link at a second angle relative to one another, wherein the second angle is different from the first angle; and
selectively operating the actuator to drive the floating plate between a first plate position and a second plate position, thereby moving the hitch assembly between the first state and the second state.

16. The method of claim 15, further comprising bearing, by the floating plate, a load on the pivot pin such that the load is not transmitted to the actuator.

17. The method of claim 15, wherein the hitch assembly operably couples a first piece of agricultural equipment and a second piece of agricultural equipment, and wherein the method further comprises:
- transporting the agricultural equipment along a paved roadway while operating the hitch assembly in the first state; and
- transporting the agricultural equipment along unpaved terrain while operating the hitch assembly in the second state.

18. The method of claim 15, wherein the main frame further comprises a second slot;
- wherein the pivot pin abuts a first end of the second slot when operating the hitch assembly in the first state; and
- wherein the pivot pin abuts a second end of the second slot when operating the hitch assembly in the second state.

19. The method of claim 18, wherein the second slot is defined in part by a pair of edges; and
- wherein the pivot pin does not contact either edge of the pair of edges during movement of the hitch assembly between the first state and the second state.

20. The method of claim 15, wherein the first angle is 10° or less.

* * * * *